United States Patent
Bruhm

[11] Patent Number: 5,325,568
[45] Date of Patent: Jul. 5, 1994

[54] TIE-DOWN DEVICE COMBINING A LOOPED STRAP AND A SNUBBING CLINCH

[76] Inventor: Ronald Bruhm, 707 Arrow Rd., Weston Ontario, Canada, M2L 2N9

[21] Appl. No.: 91,616

[22] Filed: Jun. 21, 1993

[51] Int. Cl.5 ............................................. A44B 11/00
[52] U.S. Cl. ..................... 24/301; 24/265 R; 24/265 CD
[58] Field of Search ....... 24/265 CD, 265 R, 265 EC, 24/265 AL, 265 BC, 300, 301, 68 CD; 410/110, 116, 6, 7, 8, 9, 10

[56] References Cited

U.S. PATENT DOCUMENTS

| | | | |
|---|---|---|---|
| 685,252 | 10/1901 | Bugbee | 24/265 R |
| 2,808,675 | 10/1957 | Sharp | 24/265 R |
| 2,832,358 | 4/1958 | Chambers | 24/301 |
| 3,579,746 | 5/1971 | Marik | 410/116 |
| 3,919,740 | 11/1975 | Scherb | 24/301 |
| 4,569,108 | 2/1986 | Schwab | 24/301 |

FOREIGN PATENT DOCUMENTS 0995634 6/1965 United Kingdom ......... 24/265 CD

*Primary Examiner*—Victor N. Sakran
*Attorney, Agent, or Firm*—K. Maxwell Hill

[57] ABSTRACT

A looped elastomeric strap is combined with a sinusoidal shaped snubbing clinch having a hook at one end to secure to an eyelet of a tarpaulin or to the free end of the looped strap. Parallel spaced bars are contiguously formed with the distal end of the hook to clinch and hold pairs of lays of the strap in non slip mode in the clinch.

2 Claims, 3 Drawing Sheets

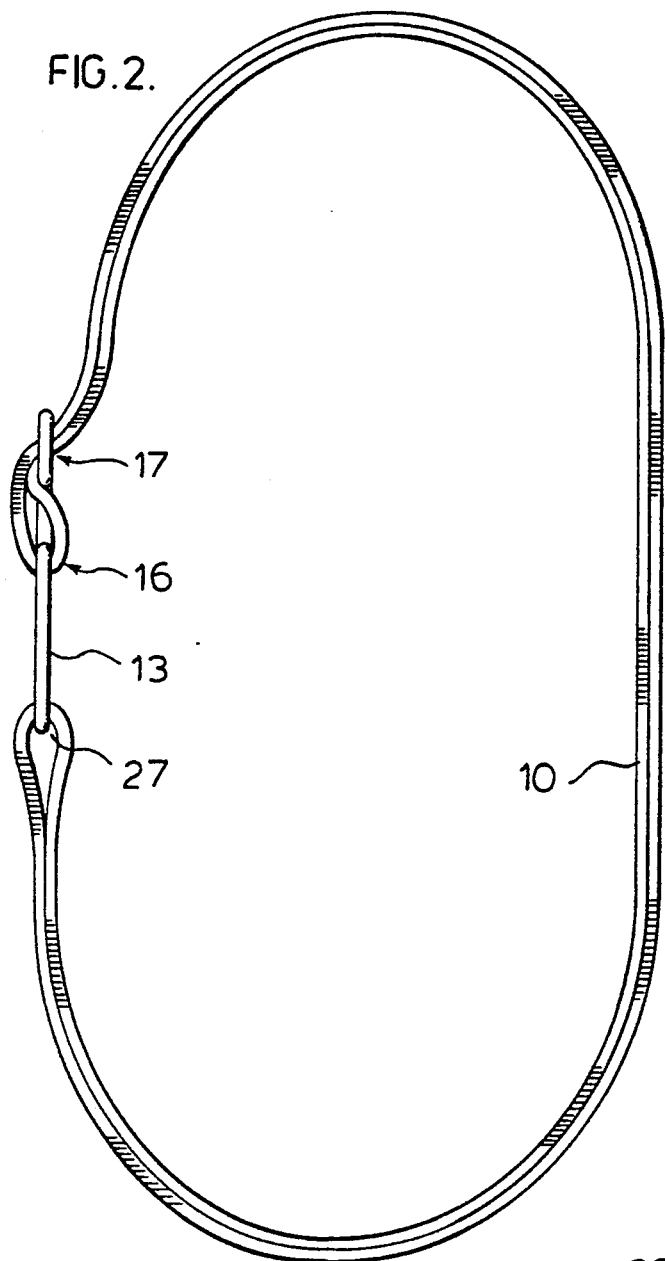
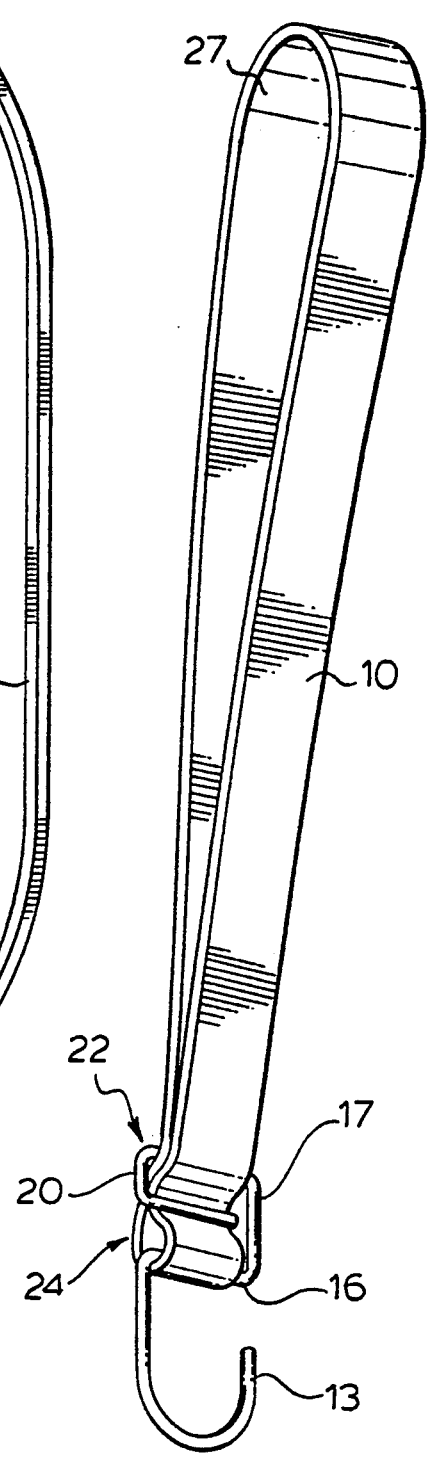

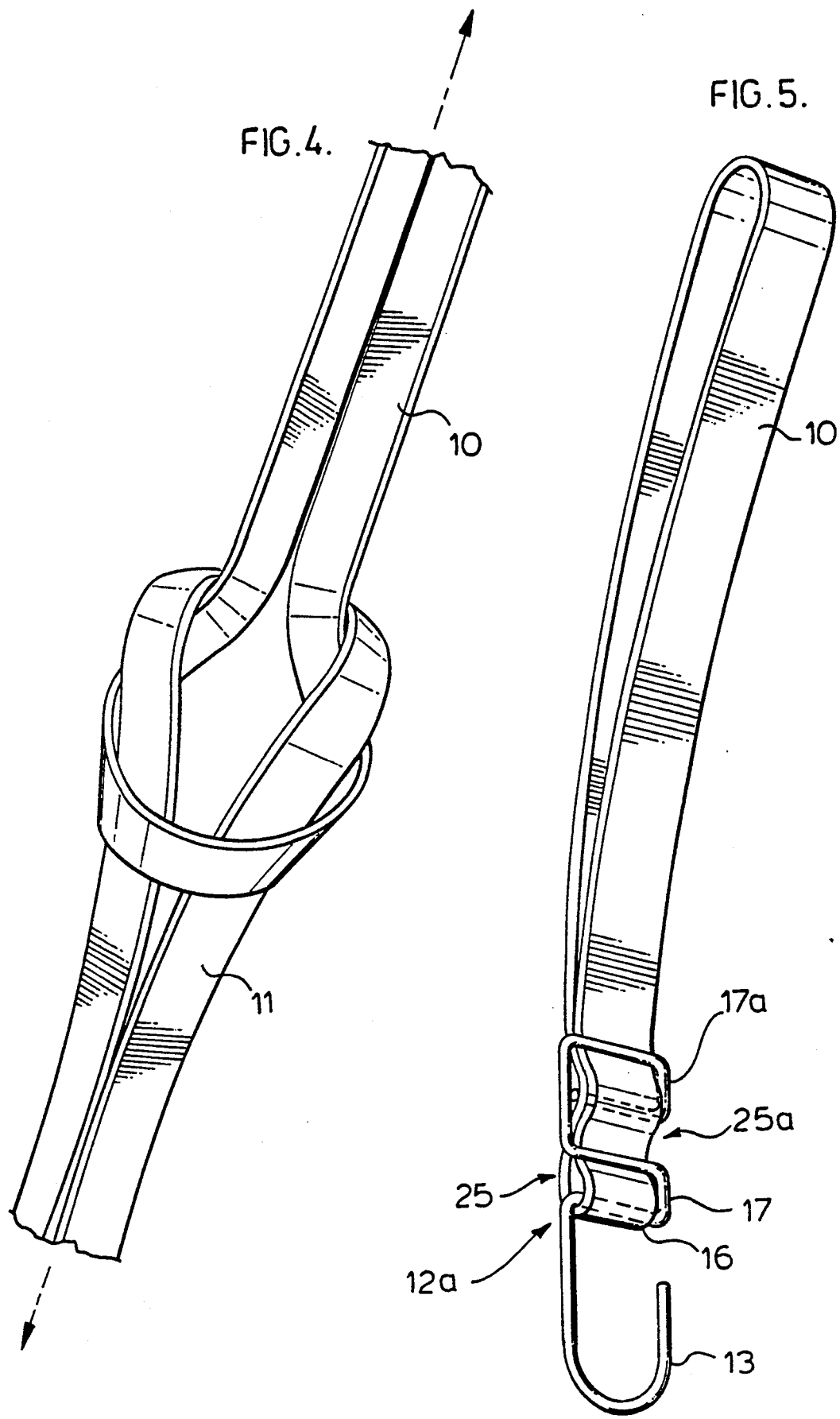

TIE-DOWN DEVICE COMBINING A LOOPED STRAP AND A SNUBBING CLINCH

FIELD OF INVENTION

The present invention relates to an improved combination of clinching device with an elastomeric strap for holding down a load to flatbed such as a truck or rail car body. The device is also of use to contain and hold a tarp or such around a bundle of goods or a single object to be enclosed from the weather or flying dirt and the like. Being flexible the combination has particular use in maintaining an automobile trunk lid in partially open position with a large object held in the trunk.

DESCRIPTION OF THE PRIOR ART

It is known to hold down tarps to a loaded truck trailer body by use of a flexible rubber cord with attached hook member. The disadvantage of the known devices is that except for a measure of elastic flexibility the cords cannot be varied in length to accomodate changes in the voluume of the load carried on the bed of the trailer and awkward methods must be resorted to that prevents the tie down strap from coming loose and the tarp from falling from the trailer.

OBJECTS OF THE INVENTION

It is the principal object of the invention herein to provide a flexible and easily variable in length, tie down device for use in tying bundles of material together or of holding in enclosed condition on a surface a load of material or objects. It is another object of the invention to combine the strap of the invention with a hook member to which the strap can be easily and quickly released or attached to effect the variable length of strap heretobefore mentioned as an object.

SUMMARY OF THE INVENTION

The inventiondescribed in this specification and shown in the accompanying drawings consists essentially of a plurality of looped elastomeric straps that can be combined singly or together with one or two clinching or snubbing hooks to provide a tie-down device to enclose surround a bundle of objects or load, It is contemplated that the load will either be resting on a truck trailer or other vehicle body such as a flatbed rail car. The straps will enclose the objects themselves or be attachedto the eyelets of a tarpaulin which has been placed over the load of objects prior to being tied down to the bed of the truck or trailer. The clinch or snubbing member is of generally sinusoidal configuration and is composed of, firstly a hook member having a looped strap holding connecting bar formed contiguously with said hook and presenting a strap entering aperture between the distal end of said hook and an end of said strap holding bar, secondly a snubbing assembly secured co-terminously to said connecting bar, consisting of a pair of parallel snubbing bars spaced apart sufficiently to accomodate at least two lays of said strap fitted therebetween, thirdly a connecting piece spanning and connecting the ends of theparallel snubbing bars.

The snubbing assembly is spaced apart from and in parallel with the holding bar to provide sufficient space to accomodate one lay of the strap when looped around the loop holding bar prior to being fitted between the snubbing bars of the snubbing assembly.

BRIEF DESCRIPTION OF THE DRAWINGS

An embodiment of the invention will now be described by way of example with reference to the accompanying drawings in which;

FIG. 2 shows in side view the clinch assebled to both loops of the strap, FIG. 3 is a perspective view of the device with the snubbing clinch shown attached to one loop of the strap.

FIG. 4 shows how two straps are interlaced together to provide greater length to the assembly.

FIG. 5 shows a hook of the clinch assembly extended with another turn to provide anti slip to the strap.

OPERATION OF THE INVENTION AND DESCRIPTION OF THE PREFERRED EMBODIMENT

Figure 1:
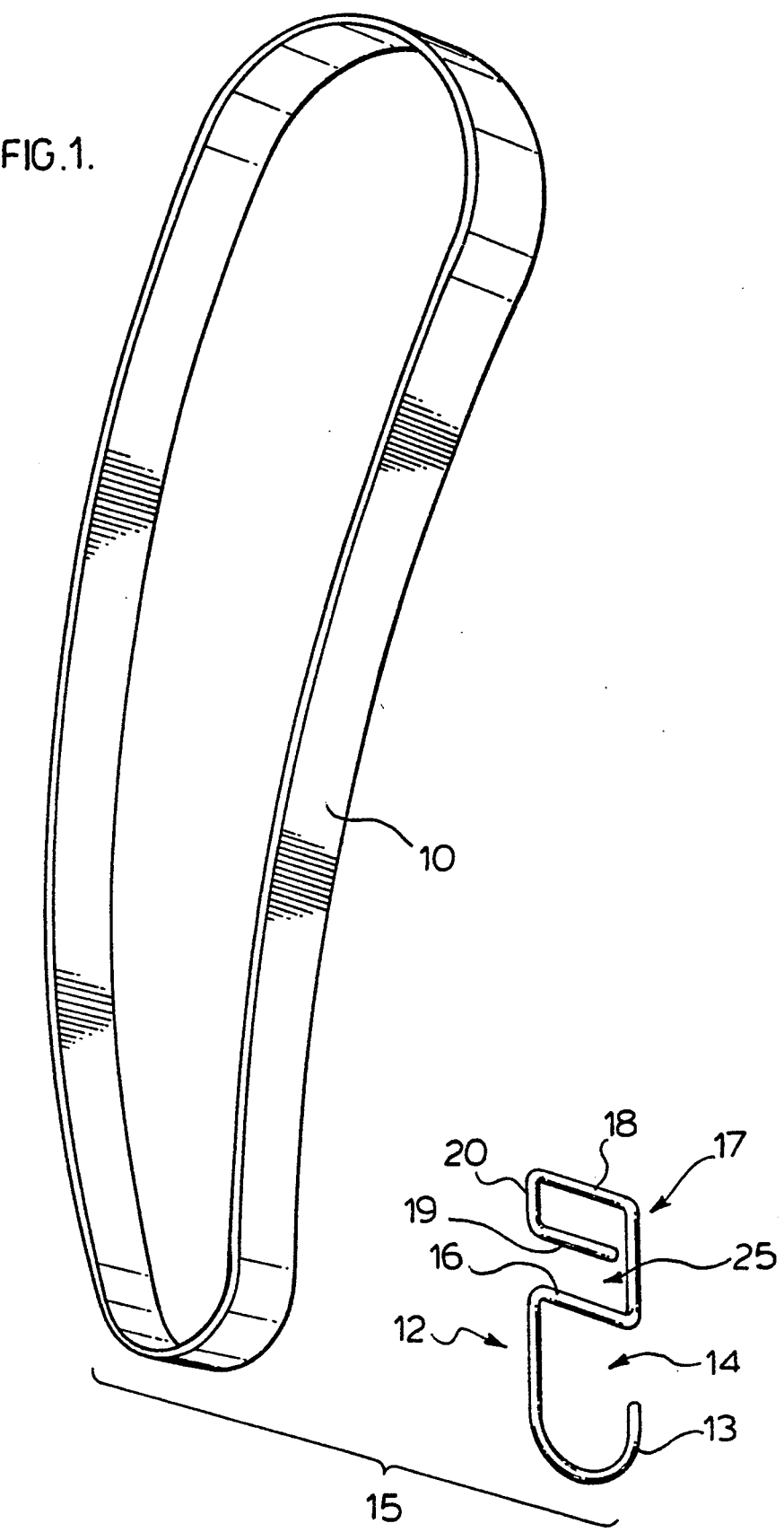
FIG. 1 is a perspective view of the stap and the clinch prior to their being assembled together.

In the drawings numeral 10 represents the strap and 12 is the snubbing clinch. In FIG. 1 numeral 15 is the combination of stap 10 and clinch 12 before assembly. The strap 10 is made of suitable strong flexible material such as rubber and the clinch is preferably made of strong wire or rigid plastic for domestic use. The clich 12 has been stamped or bent into the sinusoidal shape shown and consists of a hook 13 and a connection bar 16 contiguous with said hook 13 and presenting a strap entering aperture 25 between the distal end of the hook 13 and bar 16. A snubbing assembly 17 is secured co-terminously to said bar 16 and consists of two parralel spaced snubbing bars 18,19 spaced apart by a connecting piece 20, sufficiently to accomodate at least two lays of strap 10 when fitted therebetween. The snubbing assembly 17, isspaced apart from and in parallel with the holding bar 16 sufficient to provide space 24 in aperture 25 to accomodate one lay of strap 10 when the strap 10 is looped around holding bar 16, On assembly of strap 10 to clinch 12 a loop of strap is fitted through opening 14 over hook 13 until it surrounds bar 16 as at 24 with only one lay in aperture 25 and thereafter the strap has two lays fed together into the clinching assembly 17.

In FIG. 3 and FIG. 2 a loop 27 of strap 10 is used to encircle the load to be bundled together and fitted to hook 13 as shown to complete the function of the combination when used in that fashion to hold an object or objects together in a bundle. When the device is used to tie down a tarpaulin over a load on a truck bed the free end of thr strap is first fed through the eylet of a tarpaulin (not shown) and then through itself in the known fashion and after tightening into the eylet the strap is fed onto the hook 13 and snubbed into the clinch in double lay mode while the hook is free to engage with an attachment member on the flatbed of the truck after tensioning thereto, The reverse procedure can be used namely hooking the hook 13 to the eyelet of the tarpaulin after being sesured to the bed of the truck or trailer. In FIG. 4 the method of extending the device is shown with two straps 10 and 11 being interlaced together prior to having the free loop of one or other of the straps being attached to the clinch. FIG. 5 shows a variation of the device where a double clinch assembly is provided. The variation is numbered 12a and has a second aperture 25a created by a second clinch assembly 17a being formed during manufacture and the purpose being to provide a second pair of clinch bars thereby providing extra grip on the strap in situations where no slippage of the strap in the clinch can be tolerated.

What I claim is:

1. A load holding tie-down device comprising in combination;

a looped elastomeric strap;

a strap snubbing member of generally sinusoidal configuration; said snubbing member being composed of, firstly, a hook member having a looped strap holding connecting bar contiguous with said hook and presenting a strap entering aperture between the distal end of said hook and an end of said strap holding bar, secondly, a snubbing assembly secured co-terminously to said connecting bar, consisting of a pair of parallel snubbing bars spaced apart sufficiently to accomadate at least two lays of said strap fitted therebetween, thirdly, a connecting piece spanning and connecting the ends of said parallel snubbing bars, said snubbing assembly being spaced apart from and in parralel with said holding bar to provide sufficient space to accomadate one lay of said strap when looped around said loop holding bar prior to being fitted between the snubbing bars of the snubbing assembly.

2. A load holding tie-down device as in claim 1 wherein a pluality of straps are interlaced to lengthen the reach of the device for a large load and at least one more snubbing assembly is included in the sinusoidal configuration of the device to provide an endless locking anti-slip function to the snubbing bars through which the strap is held.

* * * * *